(No Model.) 2 Sheets—Sheet 2.
C. DOMINY.
AUTOMATIC GRAIN SCALES.
No. 421,912. Patented Feb. 25, 1890.
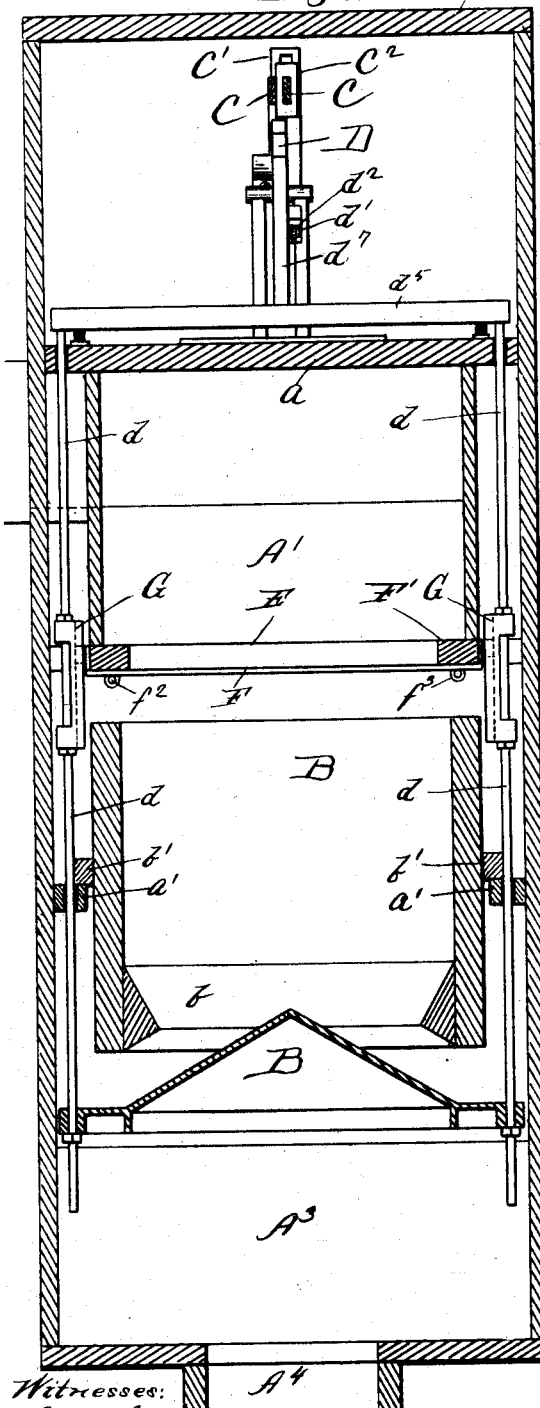
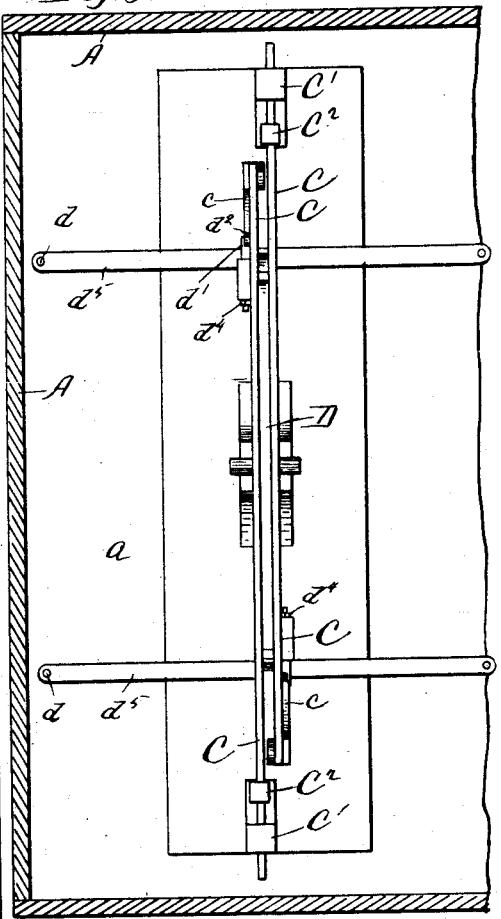
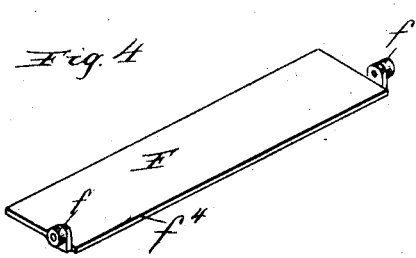
Witnesses:
Geo. C. Curtis
Emma Hack
Inventor:
Cyrenius Dominy
By Munday Evarts & Adcock
His Attorneys

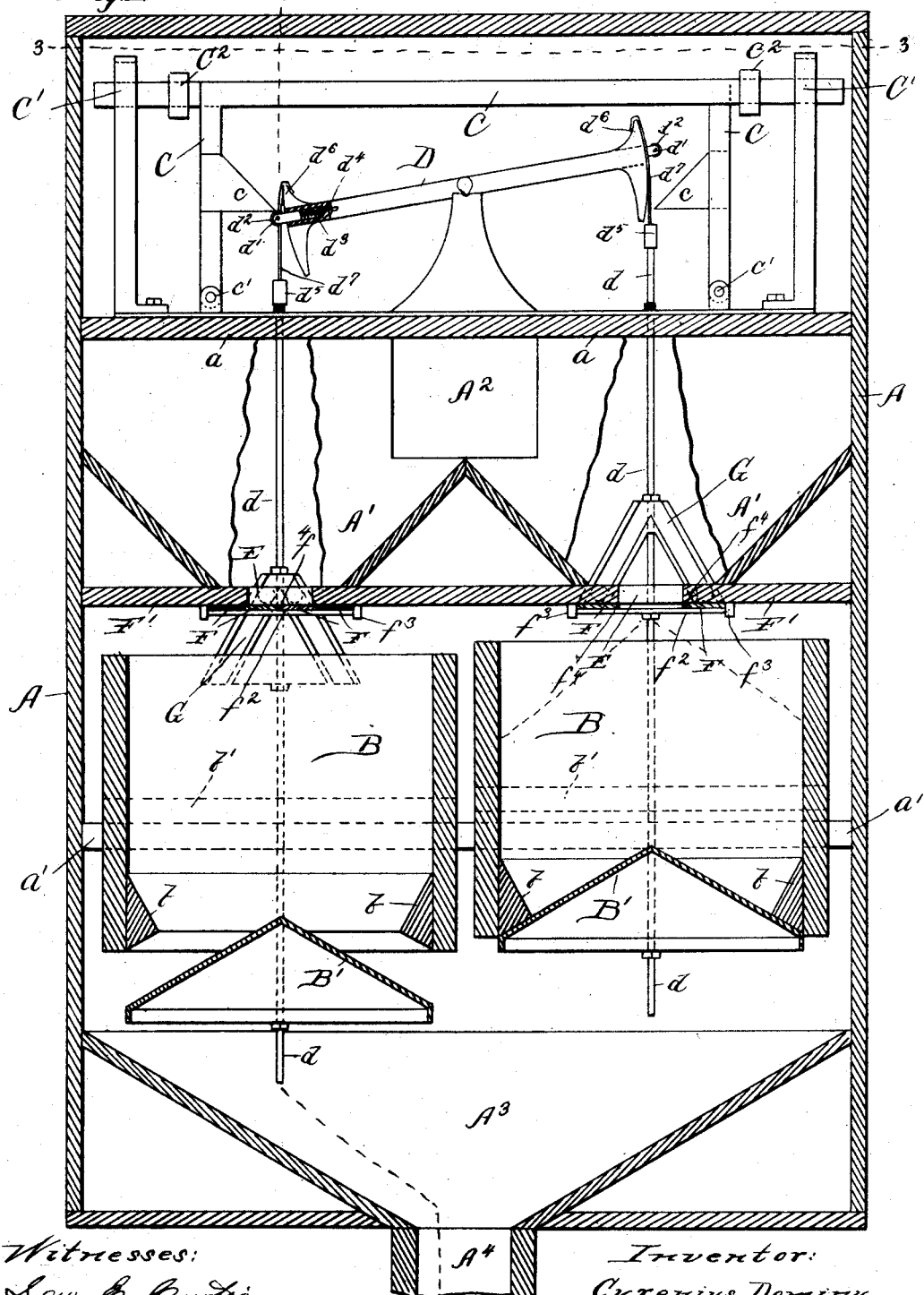

UNITED STATES PATENT OFFICE.

CYRENIUS DOMINY, OF ENGLEWOOD, ILLINOIS.

AUTOMATIC GRAIN-SCALES.

SPECIFICATION forming part of Letters Patent No. 421,912, dated February 25, 1890.

Application filed October 29, 1889. Serial No. 328,578. (No model.)

*To all whom it may concern:*

Be it known that I, CYRENIUS DOMINY, a citizen of the United States, residing in Englewood, in the county of Cook and State of Illinois, have invented a new and useful Improvement in Automatic Grain-Scales, of which the following is a specification.

My invention relates to improvements in automatic scales for weighing grain or other similar articles as discharged from an elevator or other spout, and more particularly to certain improvements upon the grain-weighing scale heretofore patented to me in Letters Patent No. 353,353, of November 30, 1886.

The object of my present improvement is to simplify the construction of the apparatus, render it cheaper and more durable, and also to increase its efficiency and its nicety and accuracy of operation.

To this end my improvement consists, first, in the construction of the weighing-buckets with a movable inclined bottom to facilitate the discharge of the grain therefrom and to prevent any possibility of grain or material remaining in the bucket and catching between the bucket and its movable bottom, and thus interfering with the proper closing of the discharge-orifice.

It further consists in the novel construction of the cut-off or valve by which the discharge of grain into the weighing-bucket is arrested at the proper moment.

It further consists in the novel means of combining the weighing-beams with the walking-beam operated by the weighing-buckets, whereby the nicety and accuracy of the weighing operation are increased.

It further consists in the novel combination of the weighing-bucket with the filling-orifice or cut-off, by which the velocity and momentum of the flowing grain are arrested or retarded as the bucket becomes nearly filled, whereby I am enabled to eliminate any error in the weighing operation due to the velocity of the flowing stream of grain or material.

It further consists in the novel devices and novel combination of parts and devices herein shown and described, and more particularly pointed out in the claims.

In the accompanying drawings, which form a part of this specification, and in which similar letters of reference indicate like parts, Figure 1 is a vertical longitudinal section of a device embodying my invention. Fig. 2 is a vertical cross-section on line 2 2 of Fig. 1, and Fig. 3 is a horizontal section on the line 3 3 of Fig. 1. Fig. 4 is a detail perspective view of one of the cut-off slides.

In the drawings, A represents the case or frame of the machine, which may be of any suitable form or construction. It is furnished with two filling-hoppers $A'$ $A'$, into which the grain or material to be weighed is received preparatory to its delivery into the weighing-buckets B B. The grain is delivered into the hoppers $A'$ $A'$ through the spout or opening $A^2$. The case A is further provided with a discharge-hopper $A^3$ and discharge-spout $A^4$, into which the grain is discharged from the buckets B B after being weighed. The case A is further provided with a horizontal partition or frame-piece $a$ above the hoppers $A'$ to support the weighing-beams C C and the walking-beam D.

Each of the weighing-buckets B preferably consists of a square or rectangular box, preferably made of wood and having an open top and bottom. Each weighing-bucket B is provided with a movable inclined bottom $B'$, supported by and connected with the walking-beam D by a rod or connection $d$. The weighing-buckets B rest upon and are supported by this movable bottom $B'$ during the weighing operation, the buckets being preferably provided with an interior tapering marginal rail $b$ near their lower ends, corresponding to the taper of the interior surface of the bottom $B'$. Each of the buckets B is also furnished with an exterior bar or projection $b'$, which engages a corresponding bar $a'$ on the frame or case of the machine when the bucket descends, thus arresting the downward motion of the bucket, so that when the bottom $B'$ farther descends the grain or material weighed will be quickly discharged from the bucket.

The weighing-beams C are pivoted at $c'$ to the frame, their free ends being guided by slotted supports $C'$. The weighing-beams C are each provided with an angle-shaped or tapering projection or pawl $c$ to engage the walking-beam D, and thus hold the bucket in its elevated or filling position until its weight is such as to lift the beam C and its countering poise $C^2$. The walking-beam D is provided or preferably provided with a spring-catch $d'$, furnished with a friction-roller $d^2$ to engage the pawl or projection $c$ of the scale-beam. The spring action of this catch permits it to slide inward or toward the pivot of the walking-beam, and thus to readily pass the point of the pawl $c$ as the walking-beam moves up or down. The spring $d^3$, employed to actuate this catch, is preferably a coil-spring, as indicated in the drawings. The position of the catch $d'$ should be so adjusted by means of the nut $d^4$ that the extreme point of the pawl or projection $c$ will project but slightly beyond the center of the friction-roller $d^2$, so that a very slight movement of the weighing-beam C and walking-beam D will cause the point of the pawl $c$ to pass beyond the center of the friction-roller $d^2$, and thus cause the apparatus to operate quickly and suddenly when it once starts, and with the requisite degree of accuracy and nicety.

The discharge-orifices E E of the hoppers A' A' are closed by a pair of cut-off knives or slides F F, which are automatically closed and opened by the movement of the buckets B B by means of cams G G, carried by and secured to the connecting-rods $d\,d$, and which engage friction-rollers $f\,f$ on the ends of the slides or knives F F. The cut-off slides F F move in suitable ways or guides beneath the bottoms F' F' of the hoppers A', said guides being preferably formed by rod $f^2$, secured to brackets $f^3$. The rods $f^2$ are preferably round rods, so that no particles of grain may lodge thereon. The cut-offs F F are preferably furnished with knife-edges $f^4$, which meet together, so that they may cut any particle of grain or material that may be caught between them, and which might otherwise interfere with their proper closing.

The horizontal partition or bottom F' of the hoppers A' A' is so combined with the buckets B B, that when the buckets are in their filling position the top of the weighing-bucket will come close to the discharge-orifice of the hopper, and the discharge-orifice of the hopper is arranged centrally with the bucket, so as to deposit or discharge the grain into the middle portion of the bucket, so that as the bucket fills with grain and becomes nearly full a cone or tapering heap of grain will be formed in the bucket, as indicated clearly in the drawings at Fig. 1, and the point of this heap of grain will operate as it approaches the discharge-orifices to arrest or retard the discharge of grain from the hopper A' into the weighing-bucket, and thus so diminish the velocity and momentum of the flowing grain as to practically eliminate all error in weighing which might otherwise arise therefrom. The connecting-rods $d$ are provided with stop-bars $d^5$ to limit the downward movement of the weighing-bucket bottoms B'.

The walking-beam D at its ends is furnished with curved shoes $d^6$, and the connecting-rods $d$ are furnished with flexible connections $d^7$, preferably of flat strips of metal, so that the operative length of the walking-beam may not vary as it tilts. The walking-beam D, it will be observed, is the equivalent for the wheel or pulley shown and described in my previous patent.

In operation, the grain being discharged in the hoppers A' A' through the opening $A^2$ and the buckets being in the position, for example, shown in Fig. 1, one of the buckets will fill with grain until the amount of grain in the bucket reaches a predetermined weight, as indicated by the poise $C^2$ on the weighing-beam, when the weight of the filled bucket will cause the walking-beam D to begin to lift the weighing-beam C, and then the spring-catch $d'$ will pass the projection or pawl $c$, thus permitting the filled bucket to rapidly drop by its own weight, and at the same time raise the bottom B' of the other bucket and thus close the other or empty bucket. As the filled bucket continues to descend it strikes against the stop A' and the weight of the grain forces the bottom B' farther down, so that the grain will discharge therefrom. The same descending movement of the filled bucket also, through the cams G G, closes the cut-off slides F F and prevents any farther discharge of grain into the filled bucket. At the same time the cut-offs F F for the opposite hopper are in the same manner opened by the upward movement of the other bucket.

I claim—

1. In combination with a pair of vertically-moving grain-weighing buckets B B, having movable bottoms B' B', a walking-beam D and connections $d\,d$ between said movable bottoms and said walking-beam, substantially as specified.

2. In combination with a pair of vertically-moving grain-weighing buckets B B, having movable bottoms B' B', a walking-beam D and connections $d\,d$ between said movable bottoms and said walking-beam, said buckets B B having bars $b'\,b'$, adapted to engage bars $a'\,a'$ on the case or frame of the machine, substantially as specified.

3. In combination with a pair of vertically-moving grain-weighing buckets B B, having movable bottoms B' B', a walking-beam D and connections $d\,d$ between said movable bottoms and said walking-beam, said buckets B B having bars $b'\,b'$, adapted to engage bars $a'\,a'$ on the case or frame of the machine, said bars $a'\,a'$ being secured on the sides of the buckets, so that the grain discharged from said buckets cannot lodge between said bars $a'$ and $b'$, substantially as specified.

4. In combination with a pair of vertically-moving grain-weighing buckets B B, having movable tapering bottoms B' B', walking-beam D, scale-beams C C, connections $d$ $d$ between said walking-beam and said bottoms B' B', and projections $a'$ $a'$, adapted to engage said buckets, substantially as specified.

5. In combination with a pair of vertically-moving grain-weighing buckets B B, having movable tapering bottoms B' B', walking-beam D, scale-beams C C, connections $d$ $d$ between said walking-beam and said bottoms B' B', projections $a'$ $a'$, adapted to engage said buckets, hoppers A' A', and cut-offs F F, operated by the vertical movement of said buckets, substantially as specified.

6. In combination with a pair of vertically-moving grain-weighing buckets B B, having movable tapering bottoms B' B', walking-beam D, scale-beams C C, connections $d$ $d$ between said walking-beam and said bottoms B' B', projections $a'$ $a'$, adapted to engage said buckets, hoppers A' A', and cut-offs F F, operated by the vertical movement of said buckets, said connections $d$ $d$ having cams G G for operating said cut-offs F F, substantially as specified.

7. In combination with a pair of vertically-moving grain-weighing buckets, a walking-beam D, connecting-rods $d$ $d$, hoppers A' A', cut-offs F F, and cams G G for operating said cut-offs, substantially as specified.

8. In combination with a pair of vertically-moving grain-weighing buckets, a walking-beam D, connecting-rods $d$ $d$, hoppers A' A', cut-offs F F, and cams G G for operating said cut-offs, said cut-offs having friction-rollers working in the grooves of said cams, substantially as specified.

9. In combination with a pair of vertically-moving grain-weighing buckets, a walking-beam D, connecting-rods $d$ $d$, hoppers A' A', cut-offs F F, and cams G G for operating said cut-offs, said cut-offs having knife-edges and supported on guide-rods, substantially as specified.

10. The combination of case or frame A with buckets B B, tapering bottoms B' B', walking-beam D, having spring-catches $d'$ $d'$, furnished with friction-rollers $d^2$ $d^2$, connecting-rods $d$ $d$, scale-beams C C, having pawls $c$ $c$, hoppers A' A', cut-offs F F, and cams G G for operating said cuts-off, substantially as specified.

11. The combination of case or frame A with buckets B B, tapering bottoms B' B', walking-beam D, connecting-rods $d$ $d$, said walking-beam having spring-catches $d'$ $d'$, furnished with friction-rollers $d^2$ $d^2$, scale-beams C C, having pawls $c$ $c$, hoppers A' A', cut-offs F F, and cams G G for operating said cut-offs, said frame A having stop-bars $a'$, and said buckets B B having bars $b'$, substantially as specified.

CYRENIUS DOMINY.

Witnesses:
EDMUND ADCOCK,
EMMA HACK.